United States Patent [19]
Remensnikov et al.

[11] 3,741,556
[45] June 26, 1973

[54] DEVICE FOR CUTTING OUT ROUND HOLES IN CYLINDRICAL AND OVAL PARTS AND STRUCTURES

[76] Inventors: Alexandr Ilich Remensnikov, prospekt Lenia, 179, kv. 114; Viktor Mikhailovich Vasiliev, ulitsa Myasnikova 12, kv. 73, both of Volgograd; Robert Ashotovich Shiganov, ulitsa Uzeir Gadzhibekov 66, kv. 6, Baku, all of U.S.S.R.

[22] Filed: July 9, 1971

[21] Appl. No.: 161,095

[52] U.S. Cl............................ 266/23 N, 266/23 M
[51] Int. Cl............................................. B23k 7/04
[58] Field of Search .............. 266/23 B, 23 D, 23 E, 266/23 K, 23 L, 23 M, 23 N

[56] References Cited
UNITED STATES PATENTS
| | | | |
|---|---|---|---|
| 495,233 | 4/1893 | Snow | 266/23 B |
| 3,612,502 | 10/1971 | Vasiliev et al. | 266/23 N |

*Primary Examiner*—Gerald A. Dost
*Attorney*—Eric H. Waters, J. Harold Nissen et al.

[57] ABSTRACT

The rod carrying the cutter moves vertically in the device in accordance with the vertical motions of the bar of the appliance which profiles the surface machined by the cutter because said rod and bar are kinematically linked by a splined rod.

1 Claim, 4 Drawing Figures

DEVICE FOR CUTTING OUT ROUND HOLES IN CYLINDRICAL AND OVAL PARTS AND STRUCTURES

The invention relates to the devices for cutting out round holes in cylindrical and oval structures and parts, mainly in boilers, tanks, heat exchangers, etc.

Known in the art are similar devices wherein the space path of the cutter is ensured by a lever, cam or some other mechanism which moves the cutter along the preset theoretical space path.

The basic disadvantage of the above-quoted mechanisms lies in that the preset theoretical curve differs greatly from the actual path which would have to be described by the cutter following the surface of the part of structure in which the hole is being cut. In fact, this difference of the paths sometimes makes the cutter come too close to the surface being machined or, on the contrary too far from it. In the first case the hole edges are melted with resultant flash and irregular line of cut, and the cutting operation may cease altogether if the cutter bears directly against the surface of the part of structure.

If the cutter is too far from the surface, cutting does not occur at all. In this case repeated cutting has to be done. Besides, after the hole has been cut, it becomes necessary to dress down flash and to level out the edge of the cut either manually or with special tools.

Also known in the art are the devices for cutting out round holes in cylindrical and oval parts and structures wherein the cutter path is determined by the trajectory of the element copying the surface according to which the hole is cut.

The majority of such devices comprise a horizontally-turning driven wheel carrying a cutter, and an appliance for profiling the surface to be machined. This appliance includes two bars installed with a provision for free vertical motion, the lower ends of these bars carrying rollers which roll over the machined surface and serve for its profiling.

The profiling appliance is linked kinematically with the turning wheel so that on turning of said wheel the entire appliance reciprocates in the plane parallel to the wheel and across the generating lines of the cylindrical or oval surface.

This causes the reciprocating vertical motions of the bars or the profiling appliance.

The bars of the profiling appliance are located on both sides of the cutter and are connected by a link with its rod which is installed in the wheel with a provision for free vertical motions.

Such a connection ensures vertical motions of the cutter in accordance with the vertical motions of the profiling appliance when the cutter rotates jointly with the wheel (see, for example, Author's Certificate No.233435, Cl.49h, 37, USSR).

The basic disadvantages of these devices reside in that they can be used for cutting out holes in structures and parts whose length is greater than the distance between the bars of the profiling appliance, and in that it is impossible to use them for cutting out holes near to the edge of a surface.

Less frequent application has been found by other devices for cutting out holes in cylindrical and oval structures and parts, which utilize profiling elements.

In these devices the profiling elements, i.e. two rollers, are fastened directly on the sides of the cutter. The cutter rod is set with a provision for moving around a circle and for free vertical motions (see, for example, Patent No.216960, Cl.49h, 37, Germany).

The main disadvantage of these devices lies in that the circle being cut out starts to bend out. As a result, the profiling roller located on the inner side of the cutting line begins to fall through and, eventually, the cutter may strike against the edge of the hole. This leads to breaking of the cutter and to other emergency situations.

An object of the present invention resides in elimination of the aforesaid disadvantages of the known devices for cutting out round holes in cylindrical and oval parts and structures.

The main object of the invention is to work out an optimum kinematic linkage between the cutter and the bar of the profiling appliance.

This object is accomplished by providing a device for cutting out round holes in cylindrical and oval parts and structures which comprises a horizontally-turning driven wheel with a built-in cutter and an appliance for profiling the machined surface, said appliance being so kinematically linked with the wheel that on turning of said wheel said appliance would move rectilinearly along the wheel plane, said appliance being made in the form of a bar installed with a provision for vertical motions and resting with one of its ends on the copied surface while the cutter is installed and connected with the profiling bar so as to be able to move vertically together with the latter and in which, according to the invention, the profiling bar is a flat rack meshing with a splined-rod installed on the same wheel whereas the rod is made in the form of a cylindrical rack meshing with the shaft gear.

Such a design ensures the most reliable and accurate transmission of motion from the bar of the profiling appliance and makes it possible to have only one profiling element, i.e. the roller.

Now the invention will be described in detail by way of example with reference to the accompanying drawings in which:

FIG. 1 is a front view of the device for cutting out round holes in cylindrical and oval parts and structures according to the invention;

FIG. 2 — same, plan view;

Figure 1:
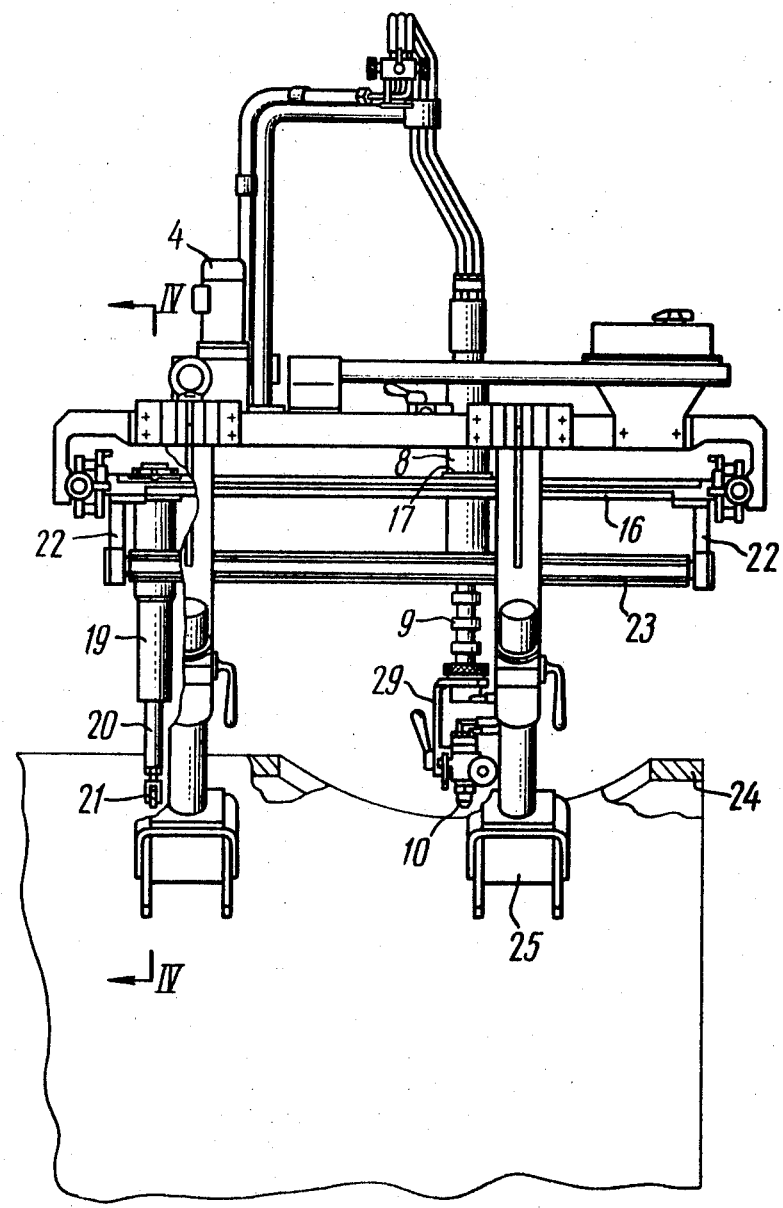

The device comprises a frame 1 (FIGS. 1–3), a toothed horizontally turning wheel 2 (FIG. 2) installed on the frame 1 in rollers 3. The wheel 2 is turned by a drive 4 (FIGS. 1–3) likewise installed on the frame 1. Fastened to the wheel 2 are the movable guide 5 and stationary guide 6 (FIG. 2). The guide 5 can be moved along its axis by the hand wheel 7. On the guides 5 and 6 is installed a carriage 8 (FIGS. 1 and 2) carrying a rod or rack 9 (FIGS. 1, 3) with a gas cutter 10.

Secured on the guide 6 is a graduated rule 11 (FIG. 2) used for setting the carriage with the cutter to the required cutting diameter.

Carriages 14 and 15 interconnected by a strip 16 (FIGS. 1,2) slide over guides 12 and 13, respectively, (FIG. 2) which are mounted on the frame 1.

The strip 16 is, in turn, connected with the carriage 8 by means of a slider 17 (FIG. 1) located in the longitudinal slot 18 of the strip 16. The same slot 18 accommodates a body 19 (FIGS. 1 and 4) installed with a provision for longitudinal motions along the strip; this body houses the bar 20 installed with a provision for free vertical motions and carrying a profiling roller 21 at the lower end.

Figure 2:
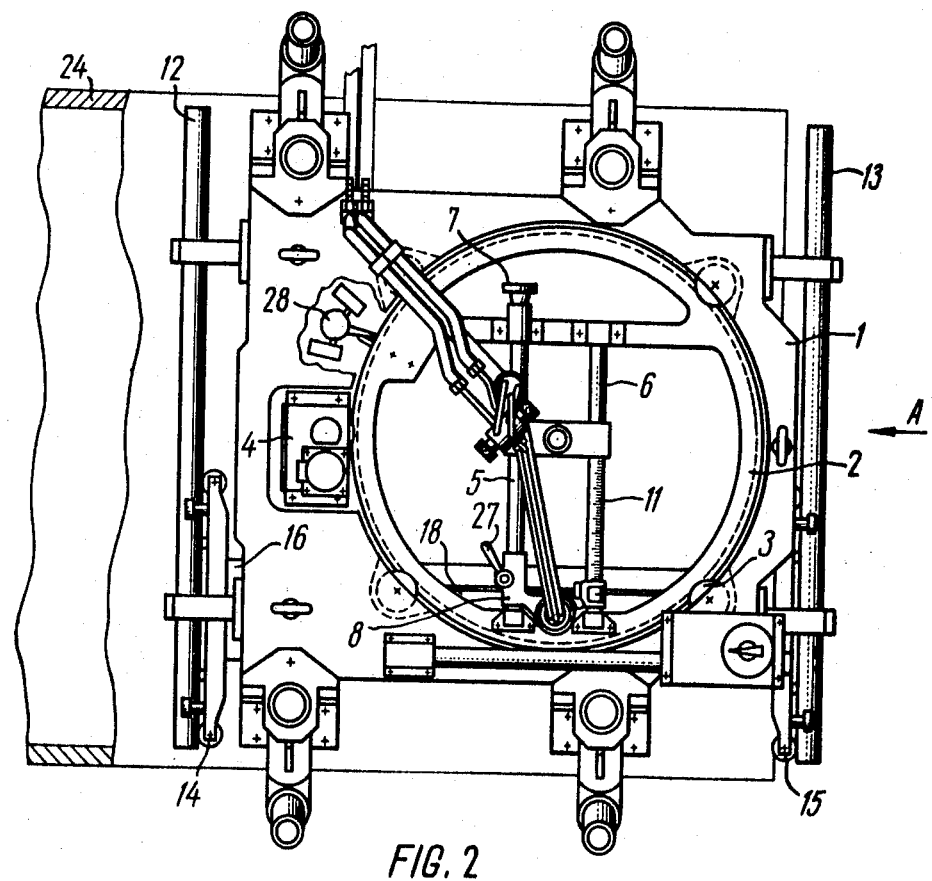
Figure 3:
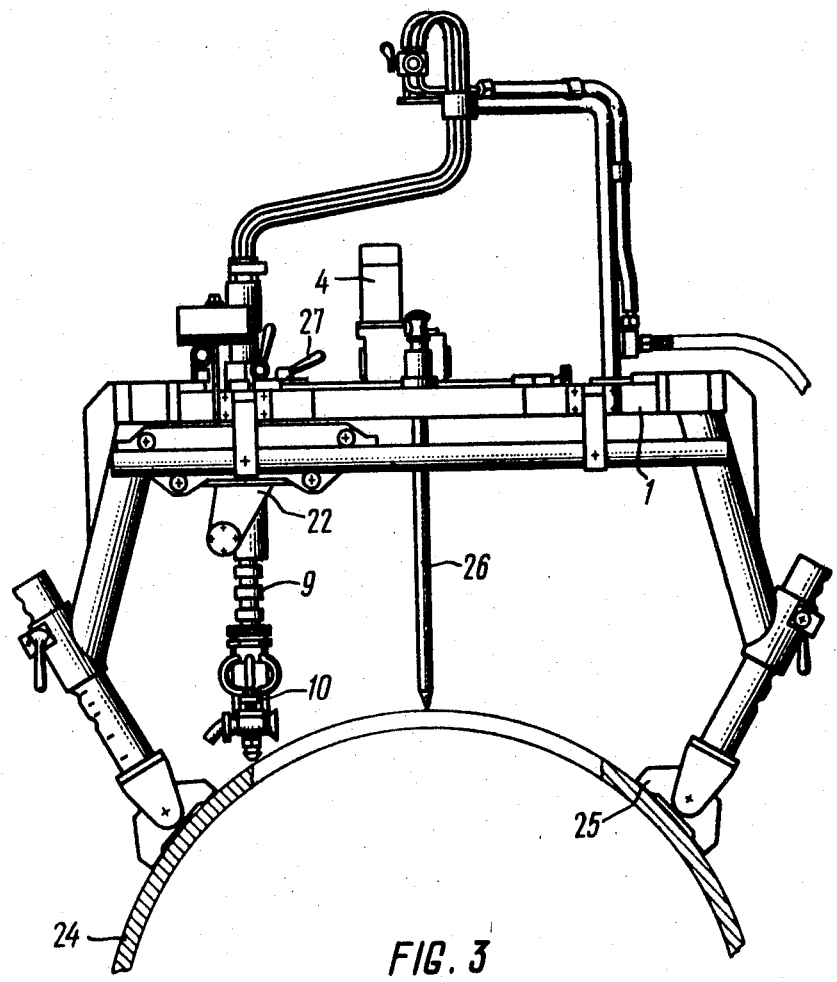
FIG. 3 is a view along arrow A in FIG. 2.
Figure 4:
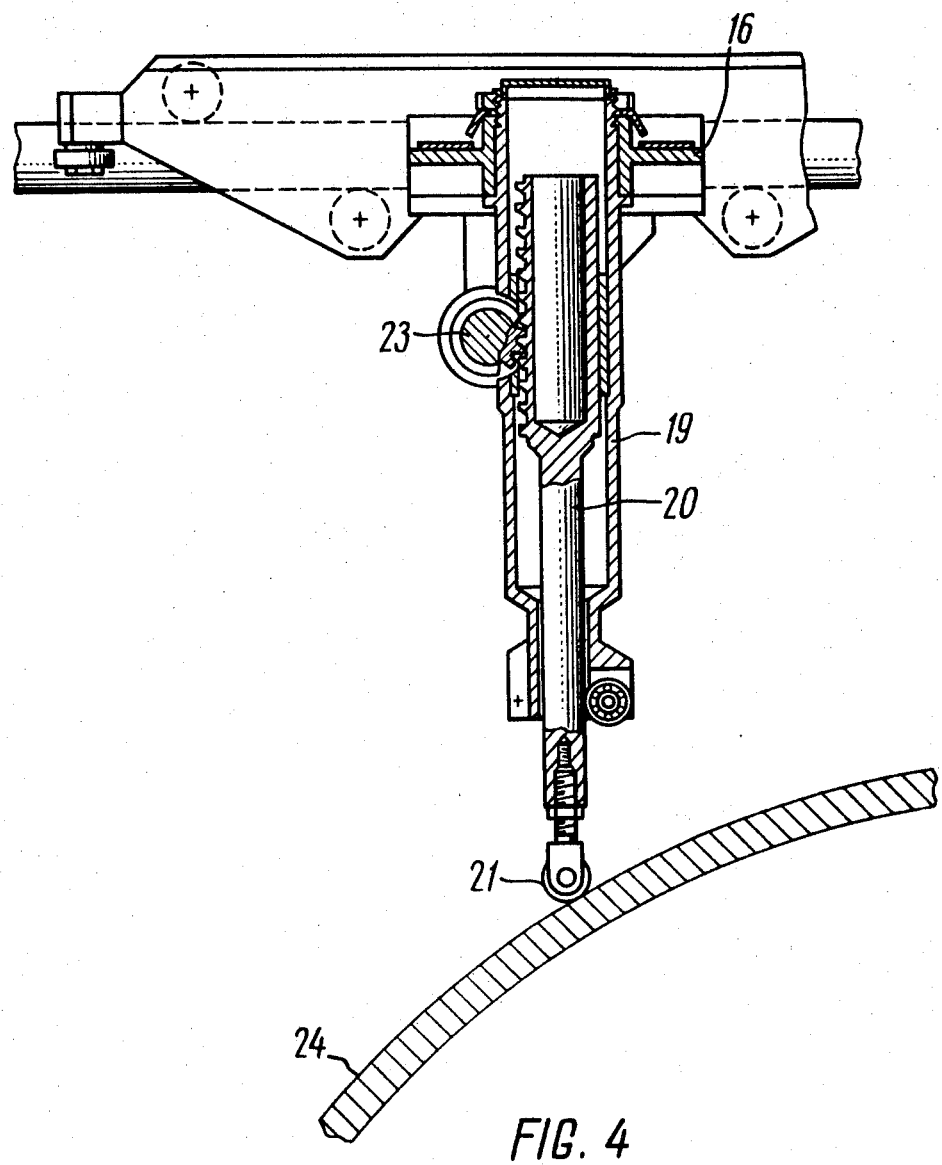
FIG. 4 is a section taken along line IV-IV in FIG. 1.

Installed on the strip 16 in supports 22 (FIGS. 1 and 3) is a splined-rod 23 (FIGS. 1 and 4).

The bar 20 is made in the form of a flat rack which meshes with the splined-rod 23.

The rod 9 of the cutter is a cylindrical rack also meshing with the splined-rod 23.

The holes can be cut by mounting the device directly on the structure or part in which the hole is being cut out, or installing it on a balkony or a portal above the structure or part being handled.

It the device is mounted directly on the structure or part 24 (FIGS. 1–4), the device is secured on its surface by means of electromagnets 25 (FIGS. 1 and 3) so as to align the hole center indicator 26 (FIG. 3) with the center of the hole center-punched on the surface of the structure 24.

Then the indicator 26 is removed so as not to interfere with the movement of the strip 16 during further operation.

Then the carriage 8 is moved over the guides 5 and 6 to set the cutter 10 to the required outside diameter of cutting, in accordance with the graduations of the rule 11. The position of the carriage 8 on the guides 5 and 6 is fixed by means of lock 27 (FIGS 2 and 3). Then the carriage 8 with the rod 9 and cutter 10 is displaced somewhat to the center of the wheel 2 by the hand wheel 7 so as to bring the cutter 10 to the point where the hole for the beginning of cutting is burnt through. Then the hole is burnt through, the carriage 8 is returned gradually to the initial position by the hand wheel 7 and the hole is cut out in the structure. When the carriage reaches the initial position, the drive 4 of the wheel 2 is turned on. The rod 9 and the cutter 10 rotate together with the wheel 2; besides, rotation of the wheel 2 moves the slider 17 along the slot 18 of the strip 16.

The movement of the slider causes rectilinear reciprocating motions of the strip 16 along the guides 12 and 13 parallel to the plane of the wheel and across the cylindrical surface of the structure.

During this motion of the strip 16 the bar 20 moves vertically, first up then down.

Owing to the above-described connection of the rod 9 of the cutter 10 with the bar 20 the following motions take place: lifting of the bar 20 rotates the splined-rod 23 which moves the rod 9 upward; as the bar goes down, the splined-rod rotates in the opposite direction and the rod 9 does down too. Thus, the cutter follows accurately the vertical motions of the profiling roller 21.

During these motions the distance between the cutter and the machined surface remains steadily the same. Having made a complete revolution, the wheel 2 together with the cutter 10 is automatically stopped by limit switches 28 (FIG. 2) and the operation of cutting out one hole is finished.

The claimed device can be used for removing chamfers from the wall of a hole. For this purpose the cutter 10 is inclined in the required direction in the T-shaped slot (not shown) of the bracket 29 (FIG. 1) which connects the cutter with the rod 9.

Then the operating cycle of the device is similar to that taking place in cutting out the hole.

After chamfering the hole the device can be transferred to a new place for cutting out the next hole.

What is claimed is:

1. A device for cutting out round holes in cylindrical and oval parts and structures comprising: a horizontally-turning driven wheel carrying a rod which is made in the form of a cylindrical rack; a cutter secured on said rod; an appliance profiling the cutter-machined surface of said cylindrical and oval parts and structures, linked kinematically with said wheel so that on turning of said wheel said appliance moves rectilinearly along the plane of said wheel; a bar of said profiling appliance which is installed with a provision for free vertical motions, which rests at one end on said surface being profiled and which is made in the form of a flat rack; a splined-rod installed in said wheel and meshing with said rod and bar.

* * * * *